United States Patent
Wu

(10) Patent No.: US 10,440,411 B2
(45) Date of Patent: Oct. 8, 2019

(54) PROGRAM PLAY CONTROL METHOD AND DIGITAL TELEVISION DEVICE

(71) Applicant: Huawei Technologies Co., Ltd., Shenzhen, Guangdong (CN)

(72) Inventor: Jun Wu, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/465,306

(22) Filed: Mar. 21, 2017

(65) Prior Publication Data

US 2017/0280171 A1    Sep. 28, 2017

(30) Foreign Application Priority Data

Mar. 22, 2016   (CN) .......................... 2016 1 0163642

(51) Int. Cl.
*H04N 21/2362*    (2011.01)
*H04N 21/434*     (2011.01)
(Continued)

(52) U.S. Cl.
CPC ....... *H04N 21/2362* (2013.01); *H04N 21/231* (2013.01); *H04N 21/2326* (2013.01);
(Continued)

(58) Field of Classification Search
None
See application file for complete search history.

(56) References Cited

U.S. PATENT DOCUMENTS

| 6,040,850 A | 3/2000 | Un et al. |
| 6,604,243 B1 | 8/2003 | Freimann |

(Continued)

FOREIGN PATENT DOCUMENTS

| CN | 1812556 A | 8/2006 |
| CN | 101064794 A | 10/2007 |

(Continued)

OTHER PUBLICATIONS

L. Sun, et al., "Storage Scheme of System Information for Digital Television Receiver"; IEEE, Jan. 2003 (Year: 2003).*

(Continued)

*Primary Examiner* — James R Marandi
(74) *Attorney, Agent, or Firm* — Womble Bond Dickinson (US) LLP

(57) ABSTRACT

A program play control method and a digital television device are disclosed. The method includes: reading section data from received transport stream TS data packets, and directly saving the section data in a nonvolatile memory without parsing, where the section data carries program specific information PSI and system information SI; if audio/video data carried in a TS data packet corresponding to the PSI needs to be played, parsing the section data to obtain the PSI and the SI, and saving the PSI and the SI; and reading the PSI from the memory, playing, according to the PSI, the audio/video data carried in the TS data packet corresponding to the PSI, reading the SI from the memory, and displaying the SI. Implementation of embodiments of the present invention can save storage space of a memory and a nonvolatile memory in a case in which no loss of PSI/SI is ensured.

18 Claims, 7 Drawing Sheets

(51) Int. Cl.
    *H04N 21/443*     (2011.01)
    *H04N 21/845*     (2011.01)
    *H04N 21/231*     (2011.01)
    *H04N 21/232*     (2011.01)
    *H04N 21/45*     (2011.01)
    *H04N 21/236*     (2011.01)

(52) U.S. Cl.
    CPC ..... *H04N 21/4345* (2013.01); *H04N 21/4435* (2013.01); *H04N 21/4516* (2013.01); *H04N 21/8455* (2013.01); *H04N 21/23605* (2013.01)

(56) References Cited

U.S. PATENT DOCUMENTS

2007/0157270 A1     7/2007   Lee
2008/0155596 A1     6/2008   Rosberg et al.

FOREIGN PATENT DOCUMENTS

EP         2320643 A2     5/2011
JP         H10215442 A     8/1998
WO       0028739 A1     5/2000

OTHER PUBLICATIONS

"Digital Video Broadcasting (DVB); Specification for Service Information (SI) in DVB systems", ETSI EN 300 468 V1.14.1, May 2014, 158 pages.
"Digital Video Broadcasting (DVB); Guidelines on implementation and usage of Service Information (SI), DVB Documents A005", Jun. 2017, 61 pages.

\* cited by examiner

PROGRAM PLAY CONTROL METHOD AND DIGITAL TELEVISION DEVICE

CROSS REFERENCE TO RELATED APPLICATIONS

This application claims priority to Chinese Patent Application No. 201610163642.2, filed on Mar. 22, 2016, which is hereby incorporated by reference in its entirety.

TECHNICAL FIELD

The present invention relates to the field of communications technologies, and in particular, to a program play control method and a digital television device.

BACKGROUND

A digital television (DTV) system is a television system in which a digital signal is used to broadcast an image and a sound. In the Moving Picture Experts Group (MPEG) standard, a transmit end (such as a television broadcast station server) in the DTV system uses a transport stream (TS) data packet as basic data and sends the transport stream data packet to a receive end (such as a set top box). The TS packet encapsulates data such as an audio, a video, program specific information, and system information (PSI/SI); the PSI is used to find, from received multiple TS packets, a TS packet that is corresponding to a program needing to be played and that carries audio/video data; and the SI includes electronic program guide information, such as a program name and a channel name that are of the program needing to be played. A digital television subscriber may perform program play control according to the PSI/SI. In a digital television system initialization stage, after receiving the TS packet, the receive end parses the PSI/SI encapsulated in the TS packet, to obtain the PSI/SI, and saves the PSI/SI in a nonvolatile memory (such as a flash). In a digital television system play stage, the digital television system reads, from the nonvolatile memory, the PSI/SI to a memory and uses the PSI/SI (for example, playing a corresponding program according to the PSI, and displaying the SI on a digital television display), so that the subscriber performs television play control.

A data format of the PSI/SI encapsulated in the TS packet is section, section data includes a large amount of cyclic structure data and variable-length string structure data, and a magnitude of each piece of cyclic structure data and a magnitude of each piece of string structure data may change from several bytes to hundreds of bytes. In the digital television system initialization stage, after receiving the section data, the receive end parses the section data to obtain the PSI/SI, and saves the PSI/SI (such as the cyclic structure data and the string structure data) in the nonvolatile memory in an array manner. In the digital television system play stage, after a digital television is powered on, the PSI/SI is read from the nonvolatile memory to a memory. A magnitude of an array needs to be preset, and generally, the magnitude of the array is an empirical value. Therefore, when the array is set to be excessively small, the PSI/SI stored in the nonvolatile memory may be lost, for example, channel program information is lost; and when the array is set to be excessively large, storage space of the nonvolatile memory may be wasted.

SUMMARY

Embodiments of the present invention disclose a program play control method and a digital television device, so as to save storage space of a memory and a nonvolatile memory in a case in which no loss of PSI/SI is ensured.

A first aspect of the embodiments of the present invention discloses a program play control method, including:
reading section data from received transport stream data TS packets, and saving the section data in a nonvolatile memory, where the section data carries program specific information PSI and system information SI;
if audio/video data carried in a TS packet corresponding to the PSI needs to be played, parsing the section data to obtain the PSI and the SI, and saving the PSI and the SI by using a dynamically allocated memory; and reading the PSI from the memory, playing, according to the PSI, the audio/video data carried in the TS packet corresponding to the PSI, reading the SI from the memory, and displaying the SI.

In the first aspect of the embodiments of the present invention, the section data is first directly saved in the nonvolatile memory; and when the PSI/SI needs to be used, the section data is parsed to obtain the PSI/SI (section data after parsing is larger than the section data before parsing), and the PSI/SI is saved in the memory in a dynamic memory allocation manner for subsequent use (for example, reading corresponding PSI from the memory, playing, according to the PSI, the video data and/or audio data carried in the transport stream data TS packet corresponding to the PSI, reading the SI from the memory, and displaying the SI). However, in the prior art, after the section data is parsed, the obtained PSI/SI is stored in a nonvolatile memory in an array manner, and when the PSI/SI needs to be used, the PSI/SI (array data) is read into a memory and used. A magnitude of an array needs to be preset; and a magnitude of section data is not fixed, accordingly, a magnitude of obtained PSI/SI is not fixed. Therefore, when the array is set to be excessively small, the PSI/SI stored in the nonvolatile memory may be lost; and when the array is set to be excessively large, storage space of the nonvolatile memory may be wasted. The storage space occupied by the PSI/SI (the section data after parsing) is greater than storage space occupied by the section data (the section data before parsing). Therefore, unlike the prior art, in the first aspect of the embodiments of the present invention, the section data is directly saved in the nonvolatile memory, so that the storage space of the nonvolatile memory may be saved; and the PSI/SI is saved in the memory in the dynamic memory allocation manner, so that a corresponding memory size may be allocated according to a magnitude of the PSI/SI, thereby saving storage space of the memory. Implementation of the first aspect of the embodiments of the present invention can save storage space of a memory and a nonvolatile memory in a case in which no loss of PSI/SI is ensured.

With reference to the first aspect of the embodiments of the present invention, in a first possible implementation manner of the first aspect of the embodiments of the present invention, before the parsing the section data to obtain the PSI and the SI, the method further includes:
storing section data index information in the nonvolatile memory, where the section data index information includes a data type of the section data and data length information of the section data, and the data length information of the section data includes start byte information of the section data and a length of the section data; and
reading the section data index information, and reading the section data by using the section data index information.

During implementation of the first possible implementation manner of the first aspect of the embodiments of the present invention, the section data index information may be stored in the nonvolatile memory; and when the section data needs to be used, the section data index information may be read from the nonvolatile memory, and the section data is quickly read according to the section data index information.

With reference to the first possible implementation manner of the first aspect of the embodiments of the present invention, in a second possible implementation manner of the first aspect of the embodiments of the present invention, the section data includes program management table PMT section data, service description table (SDT) section data, network information table NIT section data, and program associate table PAT section data, and the storing section data index information in the nonvolatile memory includes:

storing PMT index information in the nonvolatile memory, where the PMT index information includes a data type of the PMT section data and data length information of the PMT section data, and the data length information of the PMT section data includes start byte information of the PMT section data and a length of the PMT section data; and/or storing SDT index information in the nonvolatile memory, where the SDT index information includes a data type of the SDT section data and data length information of the SDT section data, and the data length information of the SDT section data includes start byte information of the SDT section data and a length of the SDT section data; and/or storing NIT index information in the nonvolatile memory, where the NIT index information includes a data type of the NIT section data and data length information of the NIT section data, and the data length information of the NIT section data includes start byte information of the NIT section data and a length of the NIT section data; and/or storing PAT index information in the nonvolatile memory, where the PAT index information includes a data type of the PAT section data and data length information of the PAT section data, and the data length information of the PAT section data includes start byte information of the PAT section data and a length of the PAT section data.

Implementation of the second possible implementation manner of the first aspect of the embodiments of the present invention is applicable to a DVB standard. The section data index information is stored in the nonvolatile memory, so that the section data may be quickly read from a section data storage area according to the index information table when the section data needs to be used subsequently.

With reference to the first possible implementation manner of the first aspect of the embodiments of the present invention, in a third possible implementation manner of the first aspect of the embodiments of the present invention, the section data includes extended text table (ETT) section data, event information table (EIT) section data, and virtual channel table (VCT) section data, and the storing section data index information in the nonvolatile memory includes:

storing ETT index information in the nonvolatile memory, where the ETT index information includes a data type of the ETT section data and data length information of the ETT section data, and the data length information of the ETT section data includes start byte information of the ETT section data and a length of the ETT section data; and/or storing EIT index information in the nonvolatile memory, where the EIT index information includes a data type of the EIT section data and data length information of the EIT section data, and the data length information of the EIT section data includes start byte information of the EIT section data and a length of the EIT section data; and/or storing VCT index information in the nonvolatile memory, where the VCT index information includes a data type of the VCT section data and data length information of the VCT section data, and the data length information of the VCT section data includes start byte information of the VCT section data and a length of the VCT section data.

Implementation of the third possible implementation manner of the first aspect of the embodiments of the present invention is applicable to an ATSC standard. The section data index information is stored in the nonvolatile memory, so that the section data is quickly read from a section data storage area according to the index information table when the section data needs to be used subsequently.

With reference to the first possible implementation manner of the first aspect of the embodiments of the present invention, in a fourth possible implementation manner of the first aspect of the embodiments of the present invention, the section data includes common data table CDT section data, and the storing section data index information in the nonvolatile memory includes:

storing CDT index information in the nonvolatile memory, where the CDT index information includes a data type of the CDT section data and data length information of the CDT section data, and the data length information of the CDT section data includes start byte information of the CDT section data and a length of the CDT section data.

Implementation of the fourth possible implementation manner of the first aspect of the embodiments of the present invention is applicable to an ISDB standard. The section data index information is stored in the nonvolatile memory, so that the section data may be quickly read from a section data storage area according to the index information table when the section data needs to be used subsequently.

With reference to the second possible implementation manner of the first aspect of the embodiments of the present invention, in a fifth possible implementation manner of the first aspect of the embodiments of the present invention, the section data index information includes the PMT index information, the SDT index information, the NIT index information, and the PAT index information, and the reading the section data index information, and reading the section data by using the section data index information includes:

reading the PMT index information, and reading the PMT section data by using the PMT index information; and/or reading the SDT index information, and reading the SDT section data by using the SDT index information; and/or reading the NIT index information, and reading the NIT section data by using the NIT index information; and/or reading the PAT index information, and reading the PAT section data by using the PAT index information.

Implementation of the fifth possible implementation manner of the first aspect of the embodiments of the present invention is applicable to a DVB standard. When the section data needs to be used, the section data index information may be read from the nonvolatile memory, and the section data is quickly read according to the section data index information.

With reference to the third possible implementation manner of the first aspect of the embodiments of the present invention, in a sixth possible implementation manner of the first aspect of the embodiments of the present invention, the section data index information includes the ETT index information, the EIT index information, and the VCT index information, and the reading the section data index information, and reading the section data by using the section data index information includes:

reading the ETT index information, and reading the ETT section data by using the ETT index information; and/or reading the EIT index information, and reading the EIT section data by using the EIT index information; and/or reading the VCT index information, and reading the VCT section data by using the VCT index information.

Implementation of the sixth possible implementation manner of the first aspect of the embodiments of the present invention is applicable to an ATSC standard. When the section data needs to be used, the section data index information may be read from the nonvolatile memory, and the section data is quickly read according to the section data index information.

With reference to the fourth possible implementation manner of the first aspect of the embodiments of the present invention, in a seventh possible implementation manner of the first aspect of the embodiments of the present invention, the section data index information includes the CDT index information, and the reading the section data index information, and reading the section data by using the section data index information includes:

reading the CDT index information, and reading the CDT section data by using the CDT index information.

Implementation of the seventh possible implementation manner of the first aspect of the embodiments of the present invention is applicable to an ISDB standard. When the section data needs to be used, the section data index information may be read from the nonvolatile memory, and the section data is quickly read according to the section data index information.

With reference to any one of the first aspect of the embodiments of the present invention or the first to the seventh possible implementation manners of the first aspect of the embodiments of the present invention, in an eighth possible implementation manner of the first aspect of the embodiments of the present invention, the reading section data from received transport stream data TS packets includes:

selecting a target TS packet from the received transport stream data TS packets, where a packet identifier of the target TS packet is a specified packet identifier, and the target TS packet includes the section data; and reading the section data from the target TS packet.

During implementation of the eighth possible implementation manner of the first aspect of the embodiments of the present invention, the target TS packet may be quickly found from the received multiple TS packets according to the packet identifier of the target TS packet, and the section data is read from the target TS packet.

A second aspect of embodiments of the present invention discloses a digital television device, including:

a reading and saving unit, configured to: read section data from received transport stream data TS packets, and save the section data in a nonvolatile memory, where the section data carries program specific information PSI and system information SI;

a parsing unit, configured to: when audio/video data carried in a TS packet corresponding to the PSI needs to be played, parse the section data to obtain the PSI and the SI;

a saving unit, configured to save the PSI and the SI by using a dynamically allocated memory; and a play and display unit, configured to: read the PSI from the memory, play, according to the PSI, the audio/video data carried in the TS packet corresponding to the PSI, read the SI from the memory, and display the SI.

During implementation of the second aspect of the embodiments of the present invention, the saving unit saves the PSI/SI in the memory in a dynamic memory allocation manner, that is, a corresponding memory may be allocated according to a magnitude of the PSI/SI, so that storage space of a memory may be saved.

With reference to the second aspect of the embodiments of the present invention, in a first possible implementation manner of the second aspect of the embodiments of the present invention, the digital television device further includes:

a storage unit, configured to store section data index information in the nonvolatile memory, where the section data index information includes a data type of the section data and data length information of the section data, and the data length information of the section data includes start byte information of the section data and a length of the section data; and a reading unit, configured to: read the section data index information, and read the section data by using the section data index information.

During implementation of the first possible implementation manner of the second aspect of the embodiments of the present invention, the storage unit may store the section data index information in the nonvolatile memory; and when the section data needs to be used, the reading unit may read the section data index information from the nonvolatile memory, and quickly read the section data by using the section data index information.

With reference to the first possible implementation manner of the second aspect of the embodiments of the present invention, in a second possible implementation manner of the second aspect of the embodiments of the present invention, the section data includes program management table PMT section data, service description table SDT section data, network information table NIT section data, and program associate table PAT section data; and a manner of storing the section data index information in the nonvolatile memory by the storage unit is specifically:

the storage unit stores PMT index information in the nonvolatile memory, where the PMT index information includes a data type of the PMT section data and data length information of the PMT section data, and the data length information of the PMT section data includes start byte information of the PMT section data and a length of the PMT section data; and/or the storage unit stores SDT index information in the nonvolatile memory, where the SDT index information includes a data type of the SDT section data and data length information of the SDT section data, and the data length information of the SDT section data includes start byte information of the SDT section data and a length of the SDT section data; and/or the storage unit stores NIT index information in the nonvolatile memory, where the NIT index information includes a data type of the NIT section data and data length information of the NIT section data, and the data length information of the NIT section data includes start byte information of the NIT section data and a length of the NIT section data; and/or the storage unit stores PAT index information in the nonvolatile memory, where the PAT index information includes a data type of the PAT section data and data length information of the PAT section data, and the data length information of the PAT section data includes start byte information of the PAT section data and a length of the PAT section data.

Implementation of the second possible implementation manner of the second aspect of the embodiments of the present invention is applicable to a DVB standard. The storage unit stores the section data index information in the nonvolatile memory, so that the reading unit may quickly read the section data from a section data storage area according to the index information table when the section data needs to be used subsequently.

With reference to the first possible implementation manner of the second aspect of the embodiments of the present invention, in a third possible implementation manner of the second aspect of the embodiments of the present invention, the section data includes extended text table ETT section data, event information table EIT section data, and virtual channel table VCT section data; and a manner of storing the section data index information in the nonvolatile memory by the storage unit is specifically:

the storage unit stores ETT index information in the nonvolatile memory, where the ETT index information includes a data type of the ETT section data and data length information of the ETT section data, and the data length information of the ETT section data includes start byte information of the ETT section data and a length of the ETT section data; and/or the storage unit stores EIT index information in the nonvolatile memory, where the EIT index information includes a data type of the EIT section data and data length information of the EIT section data, and the data length information of the EIT section data includes start byte information of the EIT section data and a length of the EIT section data; and/or the storage unit stores VCT index information in the nonvolatile memory, where the VCT index information includes a data type of the VCT section data and data length information of the VCT section data, and the data length information of the VCT section data includes start byte information of the VCT section data and a length of the VCT section data.

Implementation of the third possible implementation manner of the second aspect of the embodiments of the present invention is applicable to an ATSC standard. The storage unit stores the section data index information in the nonvolatile memory, so that the reading unit may quickly read the section data from a section data storage area according to the index information table when the section data needs to be used subsequently.

With reference to the first possible implementation manner of the second aspect of the embodiments of the present invention, in a fourth possible implementation manner of the second aspect of the embodiments of the present invention, the section data includes common data table CDT section data; and a manner of storing the section data index information in the nonvolatile memory by the storage unit is specifically:

the storage unit stores CDT index information in the nonvolatile memory, where the CDT index information includes a data type of the CDT section data and data length information of the CDT section data, and the data length information of the CDT section data includes start byte information of the CDT section data and a length of the CDT section data.

Implementation of the fourth possible implementation manner of the second aspect of the embodiments of the present invention is applicable to an ISDB standard. The storage unit stores the section data index information in the nonvolatile memory, so that the reading unit may quickly read the section data from a section data storage area according to the index information table when the section data needs to be used subsequently.

With reference to the second possible implementation manner of the second aspect of the embodiments of the present invention, in a fifth possible implementation manner of the second aspect of the embodiments of the present invention, the section data index information includes the PMT index information, the SDT index information, the NIT index information, and the PAT index information; and a manner of reading the section data index information and reading the section data by using the section data index information by the reading unit is specifically:

the reading unit reads the PMT index information, and reads the PMT section data by using the PMT index information; and/or the reading unit reads the SDT index information, and reads the SDT section data by using the SDT index information; and/or the reading unit reads the NIT index information, and reads the NIT section data by using the NIT index information; and/or the reading unit reads the PAT index information, and reads the PAT section data by using the PAT index information.

Implementation of the fifth possible implementation manner of the second aspect of the embodiments of the present invention is applicable to a DVB standard. When the section data needs to be used, the reading unit may read the section data index information from the nonvolatile memory, and quickly read the section data by using the section data index information.

With reference to the third possible implementation manner of the second aspect of the embodiments of the present invention, in a sixth possible implementation manner of the second aspect of the embodiments of the present invention, the section data index information includes the ETT index information, the EIT index information, and VCT index information; and a manner of reading the section data index information and reading the section data by using the section data index information by the reading unit is specifically:

the reading unit reads the ETT index information, and reads the ETT section data by using the ETT index information; and/or the reading unit reads the EIT index information, and reads the EIT section data by using the EIT index information; and/or the reading unit reads the VCT index information, and reads the VCT section data by using the VCT index information.

Implementation of the sixth possible implementation manner of the second aspect of the embodiments of the present invention is applicable to an ATSC standard. When the section data needs to be used, the reading unit may read the section data index information from the nonvolatile memory, and quickly read the section data by using the section data index information.

With reference to the fourth possible implementation manner of the second aspect of the embodiments of the present invention, in a seventh possible implementation manner of the second aspect of the embodiments of the present invention, the section data index information includes the CDT index information; and a manner of reading the section data index information and reading the section data by using the section data index information by the reading unit is specifically:

the reading unit reads the CDT index information, and reads the CDT section data by using the CDT index information.

Implementation of the seventh possible implementation manner of the second aspect of the embodiments of the present invention is applicable to an ISDB standard. When the section data needs to be used, the reading unit may read the section data index information from the nonvolatile memory, and quickly read the section data by using the section data index information.

With reference to any one of the second aspect of the embodiments of the present invention or the first to the seventh possible implementation manners of the second aspect of the embodiments of the present invention, in an eighth possible implementation manner of the second aspect of the embodiments of the present invention, the reading and saving unit includes:

a selecting subunit, configured to select a target TS packet from the received transport stream data TS packets, where a packet identifier of the target TS packet is a specified packet identifier, and the target TS packet includes the section data; and a reading subunit, configured to read the section data from the target TS packet.

During implementation of the eighth possible implementation manner of the second aspect of the embodiments of the present invention, the selecting subunit may quickly find the target TS packet from the received multiple TS packets according to the packet identifier of the target TS packet.

A third aspect of embodiments of the present invention discloses a digital television device, including a processor, a memory, a nonvolatile memory, a receiver, and a decoder. The receiver may include a high frequency tuner (low noise block) and a demodulator. The receiver receives a high frequency signal, and demodulates a transport stream data TS packet from the high frequency signal; and the processor is configured to invoke program code stored in the nonvolatile memory, so as to execute the following operations:

the processor reads section data from transport stream data TS packets received by the receiver, and saves the section data in the nonvolatile memory, where the section data carries program specific information PSI and system information SI;

if audio/video data carried in a TS packet corresponding to the PSI needs to be played, the processor parses the section data to obtain the PSI and the SI, and saves the PSI and the SI by using a dynamically allocated memory; and the processor reads the PSI from the memory, plays, according to the PSI, the audio/video data carried in the TS packet corresponding to the PSI, reads the SI from the memory, and displays the SI.

During implementation of the third aspect of the embodiments of the present invention, the processor saves the PSI/SI in the memory in a dynamic memory allocation manner, that is, a corresponding memory size may be allocated according to a magnitude of the PSI/SI, so that storage space of a memory may be saved.

With reference to the third aspect of the embodiments of the present invention, in a first possible implementation manner of the third aspect of the embodiments of the present invention, before parsing the section data to obtain the PSI and the SI, the processor further executes the following operations:

the processor stores section data index information in the nonvolatile memory, where the section data index information includes a data type of the section data and data length information of the section data, and the data length information of the section data includes start byte information of the section data and a length of the section data; and the processor reads the section data index information, and reads the section data by using the section data index information.

During implementation of the first possible implementation manner of the third aspect of the embodiments of the present invention, the processor may store the section data index information in the nonvolatile memory; and when the section data needs to be used, the processor may read the section data index information from the nonvolatile memory, and quickly read the section data by using the section data index information.

With reference to the first possible implementation manner of the third aspect of the embodiments of the present invention, in a second possible implementation manner of the third aspect of the embodiments of the present invention, the section data includes PMT section data, SDT section data, network information table (NIT) section data, and program associate table PAT section data; and a manner of storing the section data index information in the nonvolatile memory by the processor is specifically:

the processor stores PMT index information in the nonvolatile memory, where the PMT index information includes a data type of the PMT section data and data length information of the PMT section data, and the data length information of the PMT section data includes start byte information of the PMT section data and a length of the PMT section data; and/or the processor stores SDT index information in the nonvolatile memory, where the SDT index information includes a data type of the SDT section data and data length information of the SDT section data, and the data length information of the SDT section data includes start byte information of the SDT section data and a length of the SDT section data; and/or the processor stores NIT index information in the nonvolatile memory, where the NIT index information includes a data type of the NIT section data and data length information of the NIT section data, and the data length information of the NIT section data includes start byte information of the NIT section data and a length of the NIT section data; and/or the processor stores PAT index information in the nonvolatile memory, where the PAT index information includes a data type of the PAT section data and data length information of the PAT section data, and the data length information of the PAT section data includes start byte information of the PAT section data and a length of the PAT section data.

Implementation of the second possible implementation manner of the third aspect of the embodiments of the present invention is applicable to a DVB standard. The processor stores the section data index information in the nonvolatile memory, so that the processor may quickly read the section data from a section data storage area according to the index information table when the section data needs to be used subsequently.

With reference to the first possible implementation manner of the third aspect of the embodiments of the present invention, in a third possible implementation manner of the third aspect of the embodiments of the present invention, the section data includes extended text table ETT section data, event information table EIT section data, and virtual channel table VCT section data; and a manner of storing the section data index information in the nonvolatile memory by the processor is specifically:

the processor stores ETT index information in the nonvolatile memory, where the ETT index information includes a data type of the ETT section data and data length information of the ETT section data, and the data length information of the ETT section data includes start byte information of the ETT section data and a length of the ETT section data; and/or the processor stores EIT index information in the nonvolatile memory, where the EIT index information includes a data type of the EIT section data and data length information of the EIT section data, and the data length information of the EIT section data includes start byte information of the EIT section data and a length of the EIT section data; and/or the processor stores VCT index information in the nonvolatile memory, where the VCT index information includes a data type of the VCT section data and data length information of the VCT section data, and the data length information of the VCT section data includes start byte information of the VCT section data and a length of the VCT section data.

Implementation of the third possible implementation manner of the third aspect of the embodiments of the present invention is applicable to an ATSC standard. The processor stores the section data index information in the nonvolatile memory, so that the processor may quickly read the section data from a section data storage area according to the index information table when the section data needs to be used subsequently.

With reference to the first possible implementation manner of the third aspect of the embodiments of the present invention, in a fourth possible implementation manner of the third aspect of the embodiments of the present invention, the section data includes common data table CDT section data; and a manner of storing the section data index information in the nonvolatile memory by the processor is specifically:

the processor stores CDT index information in the nonvolatile memory, where the CDT index information includes a data type of the CDT section data and data length information of the CDT section data, and the data length information of the CDT section data includes start byte information of the CDT section data and a length of the CDT section data.

Implementation of the fourth possible implementation manner of the third aspect of the embodiments of the present invention is applicable to an ISDB standard. The processor stores the section data index information in the nonvolatile memory, so that the processor may quickly read the section data from a section data storage area according to the index information table when the section data needs to be used subsequently.

With reference to the second possible implementation manner of the third aspect of the embodiments of the present invention, in a fifth possible implementation manner of the third aspect of the embodiments of the present invention, the section data index information includes the PMT index information, the SDT index information, the NIT index information, and the PAT index information; and a manner of reading the section data index information and reading the section data by using the section data index information by the processor is specifically:

the processor reads the PMT index information, and reads the PMT section data by using the PMT index information; and/or the processor reads the SDT index information, and reads the SDT section data by using the SDT index information; and/or the processor reads the NIT index information, and reads the NIT section data by using the NIT index information; and/or the processor reads the PAT index information, and reads the PAT section data by using the PAT index information.

Implementation of the fifth possible implementation manner of the third aspect of the embodiments of the present invention is applicable to a DVB standard. When the section data needs to be used, the processor may read the section data index information from the nonvolatile memory, and quickly read the section data by using the section data index information.

With reference to the third possible implementation manner of the third aspect of the embodiments of the present invention, in a sixth possible implementation manner of the third aspect of the embodiments of the present invention, the section data index information includes the ETT index information, the EIT index information, and the VCT index information; and a manner of reading the section data index information, and reading the section data by using the section data index information by the processor is specifically:

the processor reads the ETT index information, and reads the ETT section data by using the ETT index information; and/or the processor reads the EIT index information, and parses the EIT section data by using the EIT index information; and/or the processor reads the VCT index information, and reads the VCT section data by using the VCT index information.

Implementation of the sixth possible implementation manner of the third aspect of the embodiments of the present invention is applicable to an ATSC standard. When the section data needs to be used, the processor may read the section data index information from the nonvolatile memory, and quickly read the section data by using the section data index information.

With reference to the fourth possible implementation manner of the third aspect of the embodiments of the present invention, in a seventh possible implementation manner of the third aspect of the embodiments of the present invention, the section data index information includes the CDT index information, and a manner of reading the section data index information and reading the section data by using the section data index information by the processor is specifically:

the processor reads the CDT index information, and reads the CDT section data by using the CDT index information.

Implementation of the seventh possible implementation manner of the third aspect of the embodiments of the present invention is applicable to an ISDB standard. When the section data needs to be used, the processor may read the section data index information from the nonvolatile memory, and quickly read the section data by using the section data index information.

With reference to any one of the third aspect of the embodiments of the present invention or the first to the seventh possible implementation manners of the third aspect of the embodiments of the present invention, in an eighth possible implementation manner of the third aspect of the embodiments of the present invention, a manner of reading, by the processor, the section data from the transport stream data TS packets received by the receiver is specifically:

the processor selects a target TS packet from the transport stream data TS packets received by the receiver, where a packet identifier of the target TS packet is a specified packet identifier, and the target TS packet includes the section data; and the processor reads the section data from the target TS packet.

During implementation of the eighth possible implementation manner of the third aspect of the embodiments of the present invention, the processor may quickly find the target TS packet from the received multiple TS packets according to the packet identifier of the target TS packet.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Embodiments of the present invention disclose a program play control method and a digital television device, so as to save storage space of a memory and a nonvolatile memory in a case in which no loss of PSI/SI is ensured. Details are separately illustrated in the following.

To facilitate better understanding of the embodiments of the present invention, an architecture of a digital television system disclosed in the embodiments of the present invention is first described in the following.

Figure 1:
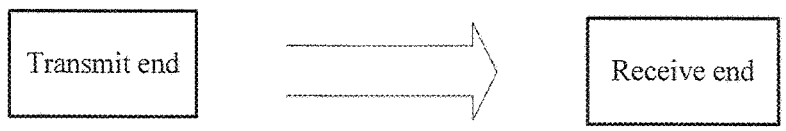
FIG. 1 is a schematic diagram of an architecture of a digital television system according to an embodiment of the present invention.

Referring to FIG. 1, FIG. 1 is a schematic diagram of an architecture of a digital television system according to an embodiment of the present invention. As shown in FIG. 1, a network architecture shown in FIG. 1 includes a transmit end and a receive end. The transmit end may include an encoder, a modulator, an antenna, and another apparatus. The receive end may include a set top box, a digital television, and another digital television device. In the digital television system, all videos, audios, text, and images are converted into data after being digitized, and are encapsulated according to a Moving Picture Experts Group (MPEG) standard, to generate multiple transport stream data (TS) packets. The transmit end sends the TS packets to the receive end, and the receive end parses and processes the TS packets, where data may be transmitted between the transmit end and the receive end in a wired connection manner or wireless connection manner, and the TS packet encapsulates data such as an audio, a video, program specific information, and system information (PSI/SI). In a digital television system initialization stage, after the receive end receives the TS packets, the receive end reads, from the TS packets, section data carrying the PSI/SI, and saves the section data in a nonvolatile memory. In a digital television system play stage, when a program needs to be played, the receive end parses the section data to obtain the PSI/SI, saves the PSI/SI by using a dynamically allocated memory, and reads the PSI/SI from the memory, so that the receive end may find, from the TS packets according to the PSI, audio/video data (such as a video or an audio) of the program that needs to be played, and plays the audio/video data; and the receive end may extract, from the TS packets according to the SI, a program play list and play parameter of a program provider, and display the program play list and play parameter to a digital television subscriber in a visual form.

A data format of the PSI/SI encapsulated in the TS packet is section, section data includes a large amount of cyclic structure data and string structure data, and a magnitude of each cyclic structure data and a magnitude of each string structure data may change from several bytes to hundreds of bytes. Because a magnitude of an array needs to be preset, if the PSI/SI is stored in an array manner, when the array is set to be excessively small, the PSI/SI stored in the nonvolatile memory may be lost; and when the array is set to be excessively large, storage space of a nonvolatile memory may be wasted. The digital television system in this embodiment of the present invention may directly save section data in a nonvolatile memory, so that storage space of the nonvolatile memory may be saved. When the section data needs to be used, the section data is parsed to obtain PSI/SI, and the PSI/SI is saved in a memory in a dynamic memory allocation manner, that is, a corresponding memory size may be allocated according to a magnitude of the PSI/SI, thereby saving storage space of the memory. Implementation of the system architecture shown in FIG. 1 can save storage space of a memory and a nonvolatile memory in a case in which no loss of PSI/SI is ensured.

Figure 2:
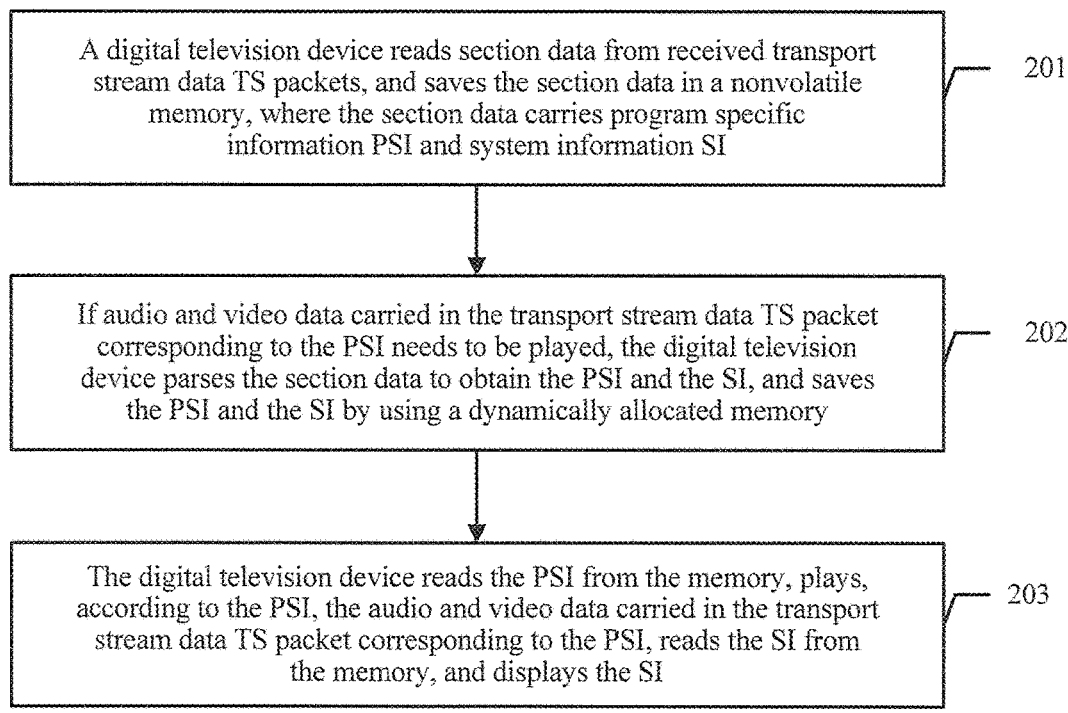
FIG. 2 is a schematic flowchart of a program play control method according to an embodiment of the present invention.

Based on the digital television system architecture shown in FIG. 1, an embodiment of the present invention discloses a program play control method. Referring to FIG. 2, FIG. 2 is a schematic flowchart of the program play control method disclosed in this embodiment of the present invention. As shown in FIG. 2, the program play control method may include the following steps.

201. A digital television device reads section data from received transport stream data TS packets, and saves the section data in a nonvolatile memory, where the section data carries program specific information PSI and system information SI.

In this embodiment of the present invention, the digital television device may include a set top box, a digital television, and another device having a data receiving function. In a digital television system initialization stage, the digital television device receives the transport stream data TS packets sent by a transmit end, reads the section data from the TS packets, and saves the section data in the nonvolatile memory. The nonvolatile memory may include a read-only memory (ROM), a programmable read-only memory (PROM), an erasable programmable read only memory (EPROM), an electrically-erasable programmable read-only memory (EEPROM), a flash, or the like. This is not limited in this embodiment of the present invention. The program specific information PSI is used to find a specific program from TS packets carrying multiple programs, and the system information SI is used to generate an electronic program guide (EPG) and provide information such as a program name, a program type, and a program start time. The section data is in a data format stipulated in a MPEG standard, and includes a maximum of 1024 bytes or 4096 bytes. The TS packets may include various types of PSI/SI section data, such as program management table (PMT) section data and program associate table (PAT) section data.

In an embodiment, step 201 may include:

(11). selecting a target TS packet from the received transport stream data TS packets, where a packet identifier of the target TS packet is a specified packet identifier, and the target TS packet includes section data; and (12). reading the section data from the target TS packet.

In this embodiment of the present invention, each TS packet has a packet identifier, and different section data is corresponding to a different packet identifier. For example, a packet identifier of the PAT section data is 0X0000, and a packet identifier of the PMT section data is 0X002. The specified packet identifier is the packet identifier of the target TS packet corresponding to the section data. By performing steps (11) and (12), the target TS packet may be quickly selected from the TS packets, and the section data is read from the target TS packet.

202. If audio/video data carried in a transport stream data TS packet corresponding to the PSI needs to be played, the digital television device parses the section data to obtain the PSI and the SI, and saves the PSI and the SI by using a dynamically allocated memory.

In this embodiment of the present invention, in a digital television system play stage, when the audio/video data carried in the transport stream data TS packet corresponding to the PSI needs to be played, the digital television device reads the section data from the nonvolatile memory, parses the section data to obtain the PSI and the SI, and saves the PSI and the SI by using a dynamically allocated memory. The audio/video data includes audio data and/or video data, the PSI and the SI includes an amount of cyclic structure data and variable-length string structure data, for example, a program service provider name, a program name, and other variable-length string structure data. Specifically, the variable-length string structure data may be saved and released by using a computer C language or C++ language. For example, string structures of a program service provider name and a program name are as follows:

```
Service_descriptor( ) {
    descriptor_tag
    descriptor_length
    service_type
    service_provider_name_length
    for (i=0; i<N; i++) {
        char
    }
    service_name_length
    for (i=0; i<N; i++) {
        char
    }
}
```

By using a malloc function of the computer C language, the foregoing string structures of a program service provider name and a program name are saved as follows:

```
char* service_provider_name_ptr =
    malloc(service_provider_name_length);
    char* service_name_ptr = malloc(service_name_length);
```

Optionally, by using a free function of the computer C language, the foregoing string structures of a program service provider name and a program name are released as follows:

free(service_provider_name_ptr);
free(service_name_ptr);

By using a new function of the computer C++ language, the foregoing string structures of a program service provider name and a program name are saved as follows:

```
char*service_provider_name_ptr= new
    char[service_provider_name_length];
    char* service_name_ptr = new char [service_name_length];
```

Optionally, by using a delete function of the computer C++ language, the foregoing string structures of a program service provider name and a program name are released as follows:

```
delete[ service_provider_name_ptr];
delete[service_name_ptr ];
```

203. The digital television device reads the PSI from the memory, plays, according to the PSI, the audio/video data carried in the transport stream data TS packet corresponding to the PSI, reads the SI from the memory, and displays the SI.

In this embodiment of the present invention, when PSI and SI are saved in a memory, the digital television device reads the PSI from the memory, and plays, according to the PSI, audio/video data carried in a transport stream data TS packet corresponding to the PSI. For example, in a Digital Video Broadcasting (DVB) standard, the PSI may include a PAT and a PMT. When a program needs to be played, the PAT is first read, a PAT packet identifier of the program is obtained from the PAT, and according to the packet identifier, a corresponding TS packet is found from TS packets and parsed, to obtain audio/video data of the program, such as an audio and a video, and decode and play the audio/video data. The digital television device reads the SI from the memory and outputs the SI to a user interface (UI) for display. For example, in the DVB standard, the SI may include an event information table (EIT). When an electronic program guide (EPG) needs to be displayed, the EIT is read, so that the EPG is generated and displayed. The EPG includes a currently played program name, start play time, and a play time segment of each program, and information about a next to-be-played program, and the like.

It can be learned that during implementation of the method shown in FIG. 2, after section data is read from received TS packets, the section data may be directly saved in a nonvolatile memory without a need of parsing the section data and then saving the section data in the nonvolatile memory in an array manner, so that storage space of the nonvolatile memory may be saved. When the section data needs to be used, the section data is read from the nonvolatile memory and parsed, so as to obtain PSI/SI, and the PSI/SI is saved in a memory in a dynamic memory allocation manner, that is, a corresponding memory size may be allocated according to a magnitude of the PSI/SI, so that storage space of a memory can be saved. This can save storage space of a memory and a nonvolatile memory in a case in which no loss of PSI/SI is ensured.

Figure 3:
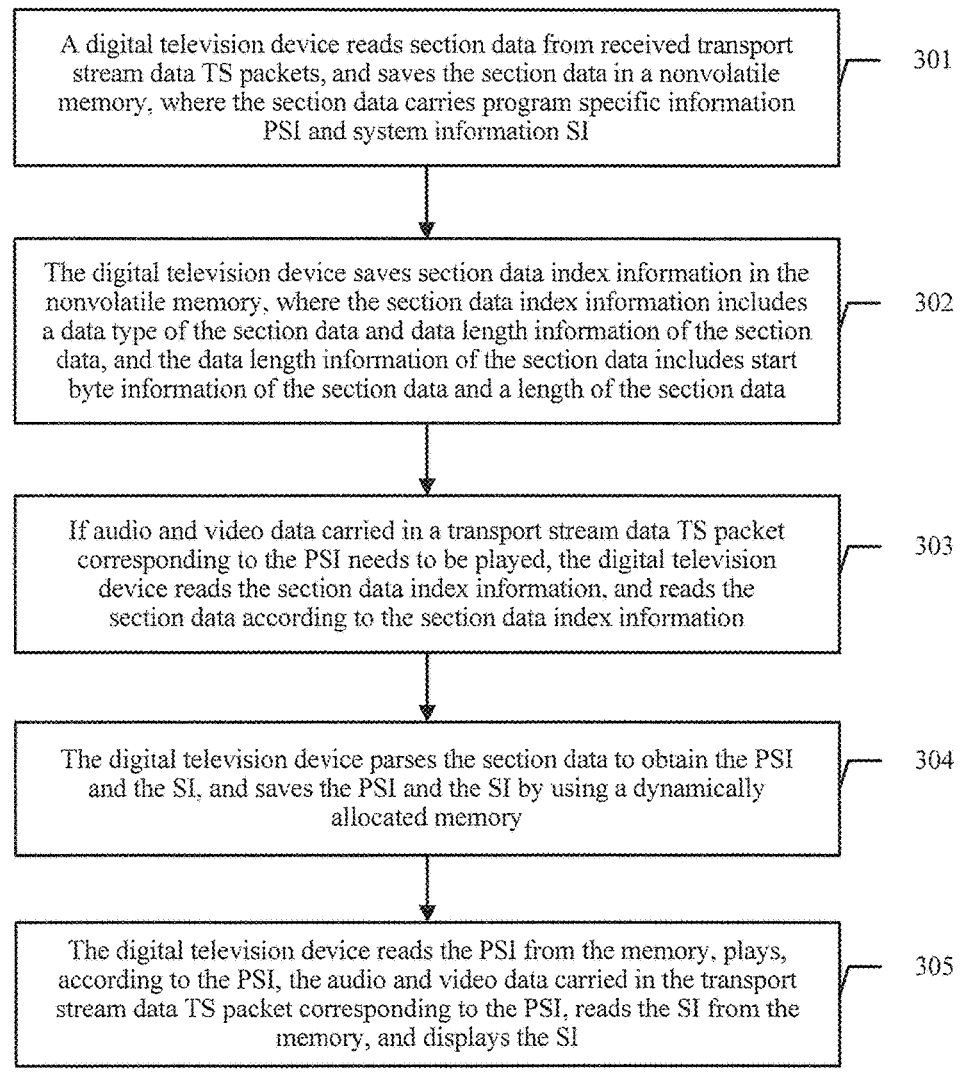
FIG. 3 is a schematic flowchart of another program play control method according to an embodiment of the present invention.

Based on the digital television system architecture shown in FIG. 1, an embodiment of the present invention discloses another program play control method. Referring to FIG. 3, FIG. 3 is a schematic flowchart of another program play control method disclosed in this embodiment of the present invention. As shown in FIG. 3, the program play control method may include the following steps.

301. A digital television device reads section data from received transport stream data TS packets, and saves the section data in a nonvolatile memory, where the section data carries program specific information PSI and system information SI.

302. The digital television device stores section data index information in the nonvolatile memory, where the section data index information includes a data type of the section data and data length information of the section data, and the data length information of the section data includes start byte information of the section data and a length of the section data.

In this embodiment of the present invention, the section data index information may include the data type of the section data and the data length information of the section data. The data type of the section data may include cyclic structure data and variable-length string structure data, and the data length information of the section data may include the start byte information of the section data and the length of the section data.

In an embodiment, in a DVB standard, the data type of the section data may include cyclic structure data or variable-length string structure data, such as PMT section data, service description table SDT (Service Description Table) section data, network information table NIT (Network Information Table) section data, PAT section data, and EIT section data. That the digital television device saves the section data in the nonvolatile memory may include:

the digital television device stores PMT index information in the nonvolatile memory, where the PMT index information includes a data type of the PMT section data and data length information of the PMT section data, and the data length information of the PMT section data includes start byte information of the PMT section data and a length of the PMT section data; and/or the digital television device stores SDT index information in the nonvolatile memory, where the SDT index information includes a data type of the SDT section data and data length information of the SDT section data, and the data length information of the SDT section data includes start byte information of the SDT section data and a length of the SDT section data; and/or the digital television device stores NIT index information in the nonvolatile memory, where the NIT index information includes a data type of the NIT section data and data length information of the NIT section data, and the data length information of the NIT section data includes start byte information of the NIT section data and a length of the NIT section data; and/or the digital television device stores PAT index information in the nonvolatile memory, where the PAT index information includes a data type of the PAT section data and data length information of the PAT section data, and the data length information of the PAT section data includes start byte information of the PAT section data and a length of the PAT section data.

Figure 4:
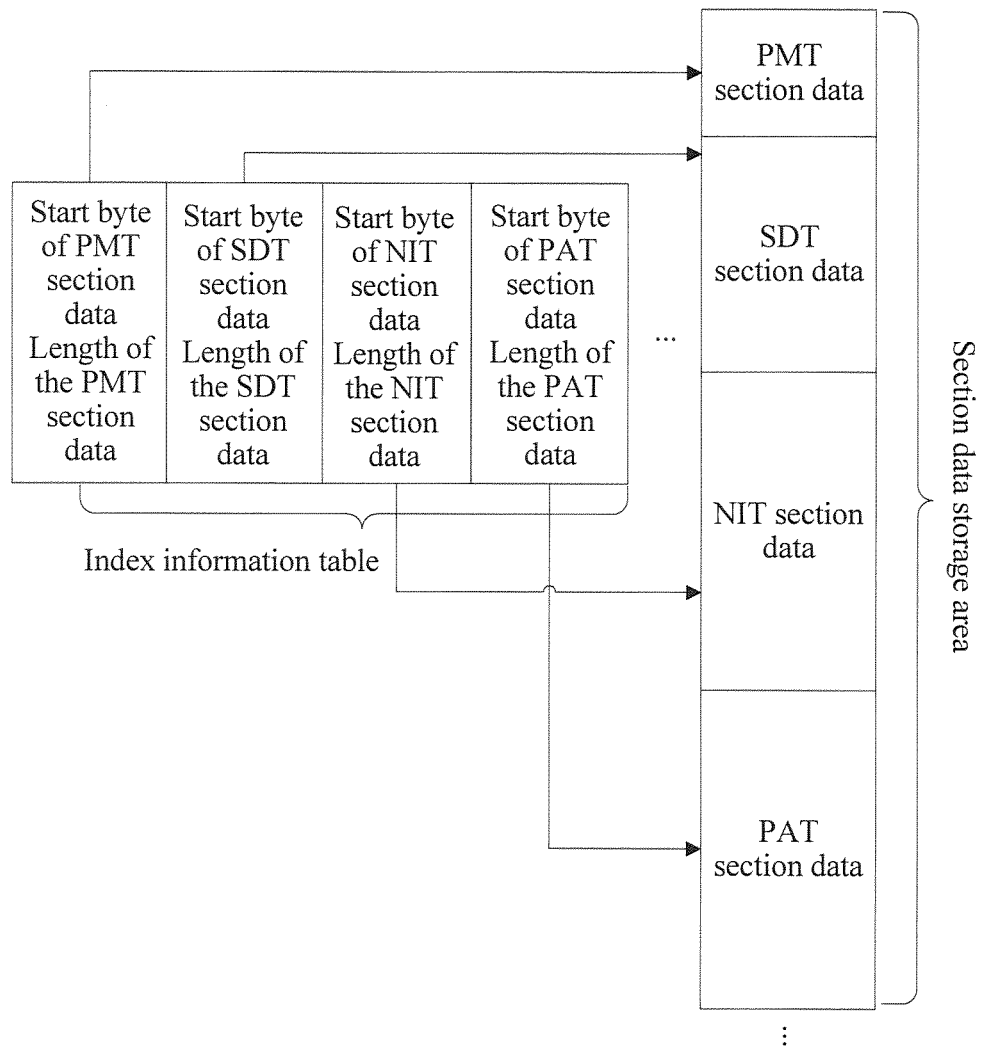
FIG. 4 is a schematic diagram of storing index information according to an embodiment of the present invention.

Specifically, the digital television device may store an index information table including index information, such as the PMT index information, SDT index information, NIT index information, and PAT index information, in the nonvolatile memory. As shown in FIG. 4, FIG. 4 is a schematic diagram of storing index information according to an embodiment of the present invention. As shown in FIG. 4, an index information table may include index information, such as PMT index information (a start byte of PMT section data and a length of the PMT section data), SDT index information (a start byte of SDT section data and a length of the SDT section data), NIT index information (a start byte of NIT section data and a length of the NIT section data), and PAT index information (a start byte of PAT section data and a length of the PAT section data). Section data, such as the PMT section data, the SDT section data, the NIT section data, and the PAT section data, is stored in a section data storage area of a nonvolatile memory. The index information table including index information, such as the PMT index information, SDT index information, NIT index information, and PAT index information, is stored in the nonvolatile memory, so that the section data may be quickly read from the section data storage area according to the index information table when data, such as the PMT section data, the SDT section data, the NIT section data, and the PAT section data, needs to be used subsequently.

In an embodiment, in an Advanced Television Systems Committee (ATSC) standard for a digital television, the data type of the section data may include cyclic structure data or variable-length string structure data, such as extended text table (ETT) section data, EIT section data, and virtual channel table (VCT) section data. The VCT section data may include terrestrial virtual channel table (TVCT) section data and cable virtual channel table (CVCT) section data. That the digital television device saves the section data in the nonvolatile memory may include:

the digital television device stores ETT index information in the nonvolatile memory, where the ETT index information includes a data type of the ETT section data and data length information of the ETT section data, and the data length information of the ETT section data includes start byte information of the ETT section data and a length of the ETT section data; and/or the digital television device stores EIT index information in the nonvolatile memory, where the EIT index information includes a data type of the EIT section data and data length information of the EIT section data, and the data length information of the EIT section data includes start byte information of the EIT section data and a length of the EIT section data; and/or the digital television device stores VCT index information in the nonvolatile memory, where the VCT index information includes a data type of the VCT section data and data length information of the VCT section data, and the data length information of the VCT section data includes start byte information of the VCT section data and a length of the VCT section data.

Figure 5:
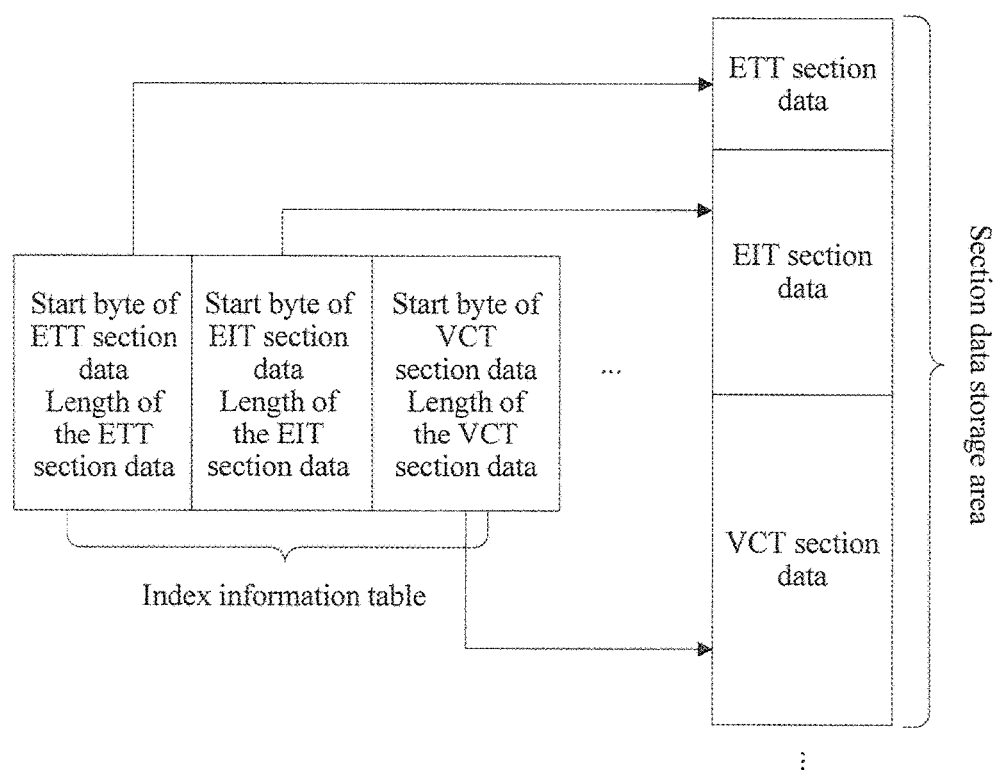
FIG. 5 is another schematic diagram of storing index information according to an embodiment of the present invention.

Specifically, the digital television device may store an index information table including index information, such as the ETT index information, EIT index information, and VCT index information, in the nonvolatile memory. As shown in FIG. 5, FIG. 5 is another schematic diagram of storing index information according to an embodiment of the present invention. As shown in FIG. 5, an index information table may include index information, such as ETT index information (a start byte of ETT section data and a length of the ETT section data), EIT index information (a start byte of EIT section data and a length of the EIT section data), and VCT index information (a start byte of VCT section data and a length of the VCT section data). Section data, such as the ETT section data, the EIT section data, and the VCT section data, is stored in a section data storage area of a nonvolatile memory. The index information table including index information, such as the ETT index information, EIT index information, and VCT index information, is stored in the nonvolatile memory, so that the section data may be quickly read from the section data storage area according to the index information table when data, such as the ETT section data, the EIT section data, the NIT section data, and the VCT section data, needs to be used subsequently.

In an embodiment, in an Integrated Service Digital Broadcasting (ISDB) standard, the data type of the section data may include cyclic structure data or variable-length string structure data, such as common data table (CDT) section data, EIT section data, PAT section data, PMT section data, and NIT section data. That the digital television device saves the section data in the nonvolatile memory may include:

storing CDT index information in the nonvolatile memory, where the CDT index information includes a data type of the CDT section data and data length information of the CDT section data, and the data length information of the CDT section data includes start byte information of the CDT section data and a length of the CDT section data.

Figure 6:
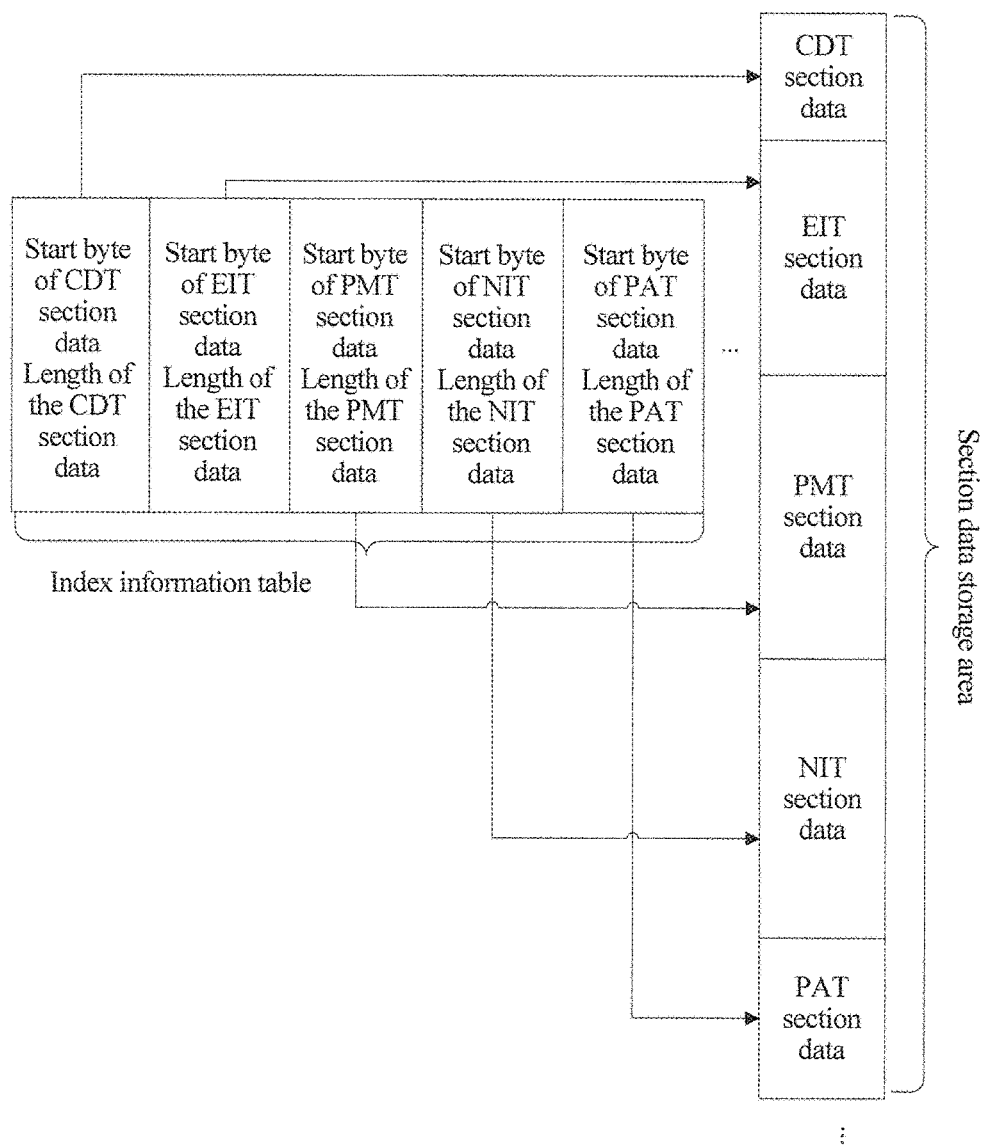
FIG. 6 is another schematic diagram of storing index information according to an embodiment of the present invention.

Specifically, the digital television device may store an index information table including index information, such as the CDT index information, the EIT index information, the PMT index information, the NIT index information, and the PAT index information, in the nonvolatile memory. As shown in FIG. 6, FIG. 6 is another schematic diagram of storing index information according to an embodiment of the present invention. As shown in FIG. 6, an index information table may include index information, such as CDT index information (a start byte of CDT section data and a length of the CDT section data), EIT index information (a start byte of EIT section data and a length of the EIT section data), PMT index information (a start byte of PMT section data and a length of the PMT section data), NIT index information (a start byte of NIT section data and a length of the NIT section data), and PAT index information (a start byte of PAT section data and a length of the PAT section data). Section data, such as the CDT section data, the EIT section data, the PAT section data, the PMT section data, and the NIT section data, is stored in a section data storage area of a nonvolatile memory. The index information table including index information, such as the CDT index information, EIT index information, PAT index information, PMT index information, and NIT index information, is stored in the nonvolatile memory, so that the section data may be quickly read from the section data storage area according to the index information table when data, such as the ETT section data, the EIT section data, the NIT section data, and the VCT section data, needs to be used subsequently.

303. If audio/video data carried in a transport stream data TS packet corresponding to the PSI needs to be played, the digital television device reads the section data index information, and reads the section data by using the section data index information.

In this embodiment of the present invention, the section data index information may include a data type of the section data and data length information of the section data, the data type of the section data may include cyclic structure data and variable-length string structure data, and the data length information of the section data may include start byte information of the section data and a length of the section data. The digital television device may read the section data index information from the nonvolatile memory, and read the section data by using the section data index information. A manner of reading the section data by using the section data index information by the digital television device may be specifically: the digital television device finds, according to the data type of the section data, the section data needing to be read, and reads, according to the data length information of the foregoing section data needing to be read, the section data needing to be read.

In an embodiment, in a DVB standard, the section data index information may include index information, such as PMT index information, SDT index information, NIT index information, PAT index information, and EIT index information. That the digital television device reads the section data by using the section data index information includes:

the digital television device reads the PMT index information, and reads the PMT section data by using the PMT index information; and/or the digital television device reads the SDT index information, and reads the SDT section data by using the SDT index information; and/or the digital television device reads the NIT index information, and reads the NIT section data by using the NIT index information; and/or the digital television device reads the PAT index information, and reads the PAT section data by using the PAT index information.

Specifically, if the PMT section data needs to be obtained, the digital television device reads the PMT index information in the section data index information, reads the PMT section data by using the data length information that is of the PMT section data and in the PMT index information, and reads the PMT section data by using the start byte information of the PMT section data and the length of the PMT section data; if the SDT section data needs to be obtained, the digital television device reads the SDT index information in the section data index information, reads the SDT section data by using the data length information that is of the SDT section data and in the SDT index information, and reads the SDT section data by using the start byte information of the SDT section data and the length of the SDT section data; if the NIT section data needs to be obtained, the digital television device reads the NIT index information in the section data index information, reads the NIT section data by using the data length information that is of the NIT section data and in the NIT index information, and reads the NIT section data by using the start byte information of the NIT section data and the length of the NIT section data; and if the PAT section data needs to be obtained, the digital television device reads the PAT index information in the section data index information, reads the PAT section data by using the data length information that is of the PAT section data and in the PAT index information, and reads the PAT section data by using the start byte information of the PAT section data and the length of the PAT section data; and the like. This embodiment is applicable to reading section data in the DVB standard.

In an embodiment, in an Advanced Television Systems Committee (ATSC) standard for a digital television, the section data index information includes ETT index information, EIT index information, and VCT index information. That the digital television device reads the section data index information, and reads the section data by using the section data index information includes:

the digital television device reads the ETT index information, and reads the ETT section data by using the ETT index information; and/or the digital television device reads the EIT index information, and parses the EIT section data by using the EIT index information; and/or the digital television device reads the VCT index information, and reads the VCT section data by using the VCT index information.

Specifically, if the ETT section data needs to be obtained, the digital television device reads the ETT index information in the section data index information, reads the ETT section data by using the data length information that is of the ETT section data and in the ETT index information, and reads the ETT section data by using the start byte information of the ETT section data and the length of the ETT section data; if the EIT section data needs to be obtained, the digital television device reads the EIT index information in the section data index information, reads the EIT section data by using the data length information that is of the EIT section data and in the EIT index information, and reads the EIT section data by using the start byte information of the EIT section data and the length of the EIT section data; and if the VCT section data needs to be obtained, the digital television device reads the VCT index information in the section data index information, reads the VCT section data by using the data length information that is of the VCT section data and in the VCT index information, and reads the VCT section data by using the start byte information of the VCT section data and the length of the VCT section data. The VCT section data may include terrestrial virtual channel table section data or cable virtual channel table section data, and the VCT index information may include TVCT index information or CVCT index information. This embodiment is applicable to reading section data in the ATSC standard.

In an embodiment, in an ISDB standard, the section data index information includes CDT index information, EIT index information, PAT index information, PMT index information, and NIT index information. That the digital television device reads the section data index information, and reads the section data by using the section data index information includes:

the digital television device reads the CDT index information, and reads the CDT section data by using the CDT index information.

Specifically, if the CDT section data needs to be obtained, the digital television device reads the CDT index information in the section data index information, reads the CDT section data by using the data length information that is of the CDT section data and in the CDT index information, and reads the CDT section data by using the start byte information of the CDT section data and the length of the CDT section data. In the ISDB standard, the section data index information may further include index information, such as EIT index information, PAT index information, PMT index information, and NIT index information, and the section data may further include section data, such as EIT section data, PAT section data, PMT section data, and NIT section data. This embodiment is applicable to reading section data in the ISDB standard.

304. The digital television device parses the section data to obtain the PSI and the SI, and saves the PSI and the SI by using a dynamically allocated memory.

305. The digital television device reads the PSI from the memory, plays, according to the PSI, the audio/video data carried in the transport stream data TS packet corresponding to the PSI, reads the SI from the memory, and displays the SI.

It can be learned that during implementation of the method shown in FIG. 3, after section data is read from received TS packets, the section data may be directly saved in a nonvolatile memory without a need of parsing the section data and then saving the section data in the nonvolatile memory in an array manner, so that storage space of the nonvolatile memory may be saved; and section data index information is saved in the nonvolatile memory. When the section data needs to be used, the section data index information is read from the nonvolatile memory, the section data is quickly read according to the section data index information, the section data is parsed to obtain PSI/SI, and the PSI/SI is saved in a memory in a dynamic memory allocation manner. A corresponding memory size may be allocated according to a magnitude of the PSI/SI, so that storage space of a memory can be saved. This can save storage space of a memory and a nonvolatile memory in a case in which no loss of PSI/SI is ensured. In addition, the section data index information is pre-stored in the nonvolatile memory, so that the section data may be quickly read according to the section data index information, thereby improving efficiency of reading the section data in the nonvolatile memory.

Figure 7:
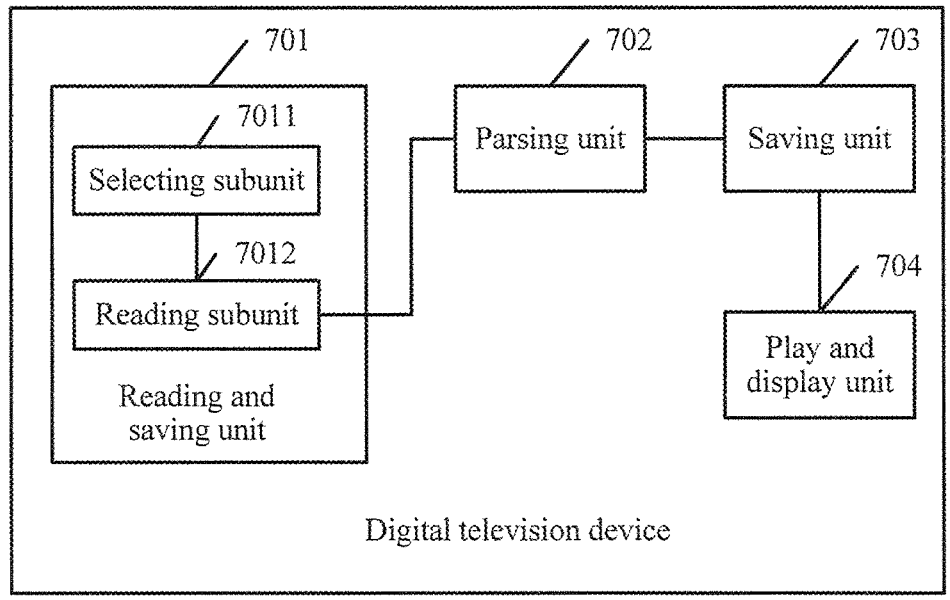
FIG. 7 is a schematic structural diagram of a digital television device according to an embodiment of the present invention.

Based on the digital television system architecture shown in FIG. 1, an embodiment of the present invention discloses a digital television device. Referring to FIG. 7, FIG. 7 is a schematic structural diagram of the digital television device disclosed in this embodiment of the present invention. As shown in FIG. 7, the digital television device may include:

a reading and saving unit 701, configured to: read section data from received transport stream data TS packets, and save the section data in a nonvolatile memory, where the section data carries program specific information PSI and system information SI;

a parsing unit 702, configured to: when audio/video data carried in a transport stream data TS packet corresponding to the PSI needs to be played, parse the section data to obtain the PSI and the SI;

a saving unit 703, configured to save the PSI and the SI by using a dynamically allocated memory; and a play and display unit 704, configured to: read the PSI from the memory, play, according to the PSI, the audio/video data carried in the transport stream data TS packet corresponding to the PSI, read the SI from the memory, and display the SI.

In an optional implementation manner, the reading and saving unit 701 includes:

a selecting subunit 7011, configured to select a target TS packet from the received transport stream data TS packets, where a packet identifier of the target TS packet is a specified packet identifier, and the target TS packet includes the section data; and a reading subunit 7012, configured to read the section data from the target TS packet.

Figure 8:
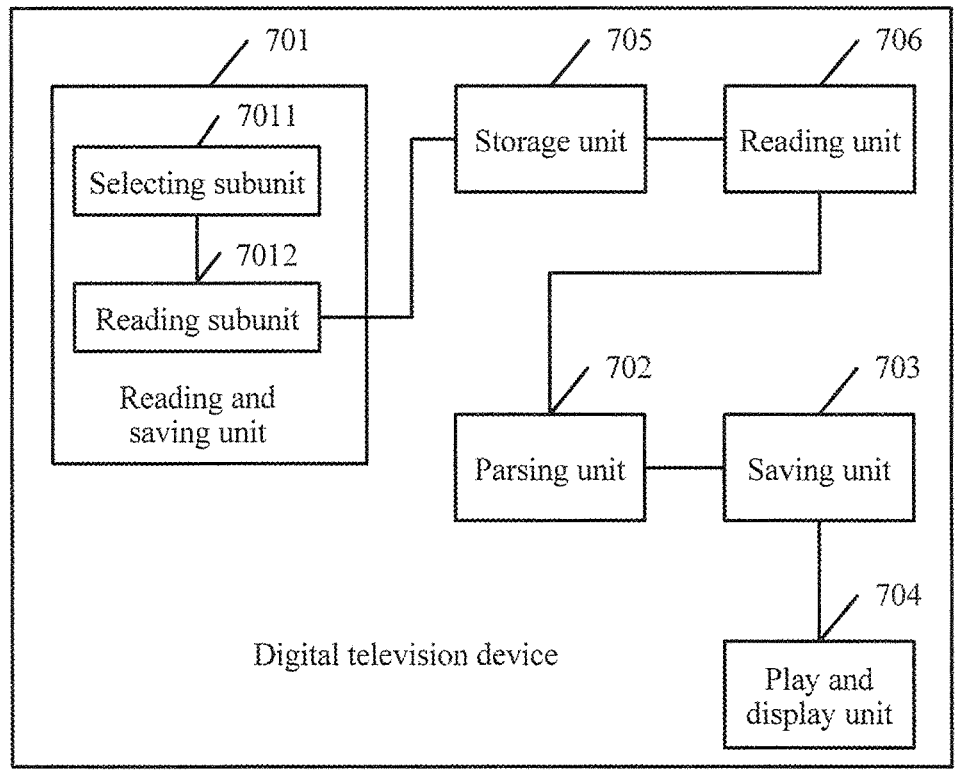
FIG. 8 is a schematic structural diagram of another digital television device according to an embodiment of the present invention.

Referring to FIG. 8, FIG. 8 is a schematic structural diagram of another digital television device disclosed in this embodiment of the present invention. The digital television device shown in FIG. 8 is obtained by optimizing the digital television device shown in FIG. 7, and compared with the digital television device shown in FIG. 7, the digital television device shown in FIG. 8 may further include:

a storage unit 705, configured to: after the reading and saving unit 701 reads the section data from the received transport stream data TS packet, store section data index information in the nonvolatile memory, where the section data index information includes a data type of the section data and data length information of the section data, and the data length information of the section data includes start byte information of the section data and a length of the section data; and a reading unit 706, configured to: after the storage unit 705 stores the section data index information in the nonvolatile memory, read the section data index information, and read the section data by using the section data index information.

Correspondingly, if the section data includes program management table PMT section data, service description table SDT section data, network information table NIT section data, and program associate table PAT section data, a manner of storing the section data index information in the nonvolatile memory by the storage unit 705 is specifically:

the storage unit 705 stores PMT index information in the nonvolatile memory, where the PMT index information includes a data type of the PMT section data and data length information of the PMT section data, and the data length information of the PMT section data includes start byte information of the PMT section data and a length of the PMT section data; and/or the storage unit 705 stores SDT index information in the nonvolatile memory, where the SDT index information includes a data type of the SDT section data and data length information of the SDT section data, and the data length information of the SDT section data includes start byte information of the SDT section data and a length of the SDT section data; and/or the storage unit 705 stores NIT index information in the nonvolatile memory, where the NIT index information includes a data type of the NIT section data and data length information of the NIT section data, and the data length information of the NIT section data includes start byte information of the NIT section data and a length of the NIT section data; and/or the storage unit 705 stores PAT index information in the nonvolatile memory, where the PAT index information includes a data type of the PAT section data and data length information of the PAT section data, and the data length information of the PAT section data includes start byte information of the PAT section data and a length of the PAT section data.

If the section data index information includes the PMT index information, the SDT index information, the NIT index information, and the PAT index information, a manner of reading the section data index information and reading the section data by using the section data index information by the reading unit 706 is specifically:

the reading unit 706 reads the PMT index information, and reads the PMT section data by using the PMT index information; and/or the reading unit 706 reads the SDT index information, and reads the SDT section data by using the SDT index information; and/or the reading unit 706 reads the NIT index information, and reads the NIT section data by using the NIT index information; and/or the reading unit 706 reads the PAT index information, and reads the PAT section data by using the PAT index information.

Correspondingly, if the section data includes extended text table ETT section data, event information table EIT section data, and virtual channel table VCT section data, a manner of storing the section data index information in the nonvolatile memory by the storage unit 705 is specifically:

the storage unit 705 stores ETT index information in the nonvolatile memory, where the ETT index information includes a data type of the ETT section data and data length information of the ETT section data, and the data length information of the ETT section data includes start byte information of the ETT section data and a length of the ETT section data; and/or the storage unit 705 stores EIT index information in the nonvolatile memory, where the EIT index information includes a data type of the EIT section data and data length information of the EIT section data, and the data length information of the EIT section data includes start byte information of the EIT section data and a length of the EIT section data; and/or the storage unit 705 stores VCT index information in the nonvolatile memory, where the VCT index information includes a data type of the VCT section data and data length information of the VCT section data, and the data length information of the VCT section data includes start byte information of the VCT section data and a length of the VCT section data.

If the section data index information includes the ETT index information, EIT index information, and VCT index information, a manner of reading the section data index information and reading the section data by using the section data index information by the reading unit 706 is specifically:

the reading unit 706 reads the ETT index information, and reads the ETT section data by using the ETT index information; and/or the reading unit 706 reads the EIT index information, and reads the EIT section data by using the EIT index information; and/or the reading unit 706 reads the VCT index information, and reads the VCT section data by using the VCT index information.

Correspondingly, if the section data includes common data table CDT section data, a manner of storing the section data index information in the nonvolatile memory by the storage unit 705 is specifically:

the storage unit 705 stores CDT index information in the nonvolatile memory, where the CDT index information includes a data type of the CDT section data and data length information of the CDT section data, and the data length information of the CDT section data includes start byte information of the CDT section data and a length of the CDT section data.

If the section data index information includes the CDT index information, a manner of reading the section data index information and reading the section data by using the section data index information by the reading unit 706 is specifically:

the reading unit 706 reads the CDT index information, and reads the CDT section data by using the CDT index information.

During implementation of the digital television devices described in FIG. 7 and FIG. 8, the storage unit 705 directly saves section data in a nonvolatile memory, so that storage space of the nonvolatile memory may be saved, and the saving unit 703 saves PSI/SI in a memory in a dynamic memory allocation manner, that is, a corresponding memory size may be allocated according to a magnitude of the PSI/SI, so that storage space of a memory can be saved. This can save storage space of a memory and a nonvolatile memory in a case in which no loss of PSI/SI is ensured.

Figure 9:
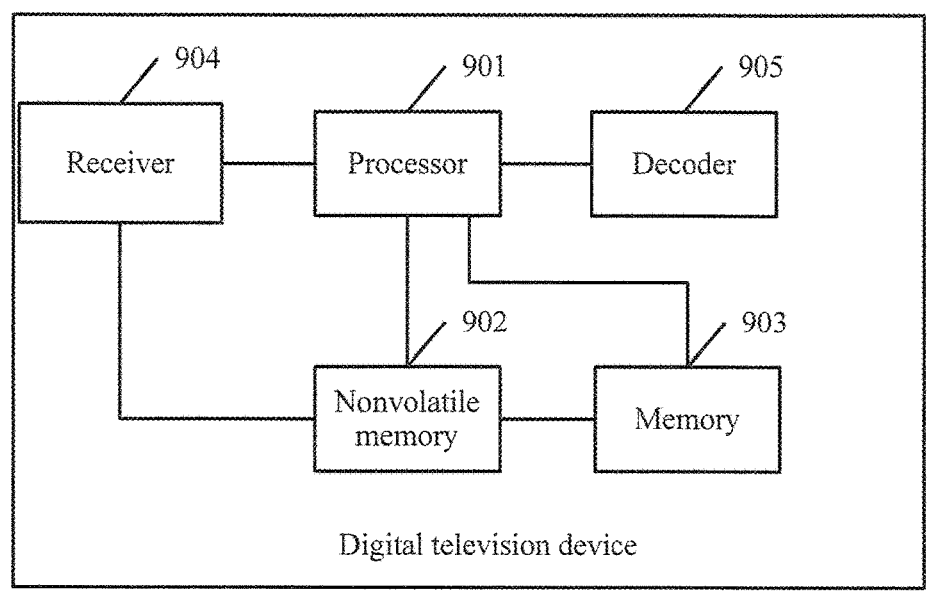
FIG. 9 is a schematic structural diagram of still another digital television device according to an embodiment of the present invention.

Referring to FIG. 9, FIG. 9 is a schematic structural diagram of still another digital television device disclosed in this embodiment of the present invention. The digital television device shown in FIG. 9 includes a processor 901, a memory 902, a nonvolatile memory 903, a receiver 904, and a decoder 905. The receiver 904 may include a high frequency tuner (low noise block) and a demodulator. The receiver 904 receives a high frequency signal, and demodulates a transport stream data TS packet from the high frequency signal; and the processor 901 is configured to invoke program code stored in the nonvolatile memory 903, so as to execute the following operations:

the processor 901 reads section data from transport stream data TS packets received by the receiver 904, and saves the section data in the nonvolatile memory 903, where the section data carries program specific information PSI and system information SI;

if audio/video data carried in a transport stream data TS packet corresponding to the PSI needs to be played, the processor 901 parses the section data to obtain the PSI and the SI, and saves the PSI and the SI by using a dynamically allocated memory; and the processor 901 reads the PSI from the memory 902, plays, according to the PSI, the audio/video data carried in the transport stream data TS packet corresponding to the PSI, reads the SI from the memory, and displays the SI.

As an optional implementation manner, before parsing the section data to obtain the PSI and the SI, the processor 901 further executes the following operations:

the processor 901 stores section data index information in the nonvolatile memory 903, where the section data index information includes a data type of the section data and data length information of the section data, and the data length information of the section data includes start byte information of the section data and a length of the section data.

As an optional implementation manner, after storing the section data index information in the nonvolatile memory 903 and before parsing the section data to obtain the PSI and the SI, the processor 901 further executes the following operations:

the processor 901 reads the section data index information, and reads the section data by using the section data index information.

As an optional implementation manner, the section data includes program management table PMT section data, service description table SDT section data, network information table NIT section data, and program associate table PAT section data, and a manner of storing the section data index information in the nonvolatile memory 903 by the processor 901 is specifically:

the processor 901 stores PMT index information in the nonvolatile memory 903, where the PMT index information includes a data type of the PMT section data and data length information of the PMT section data, and the data length information of the PMT section data includes start byte information of the PMT section data and a length of the PMT section data; and/or the processor 901 stores SDT index information in the nonvolatile memory 903, where the SDT index information includes a data type of the SDT section data and data length information of the SDT section data, and the data length information of the SDT section data includes start byte information of the SDT section data and a length of the SDT section data; and/or the processor 901 stores NIT index information in the nonvolatile memory 903, where the NIT index information includes a data type of the NIT section data and data length information of the NIT section data, and the data length information of the NIT section data includes start byte information of the NIT section data and a length of the NIT section data; and/or the processor 901 stores PAT index information in the nonvolatile memory 903, where the PAT index information includes a data type of the PAT section data and data length information of the PAT section data, and the data length information of the PAT section data includes start byte information of the PAT section data and a length of the PAT section data.

As an optional implementation manner, the section data includes extended text table ETT section data, event information table EIT section data, and virtual channel table VCT section data, and a manner of storing the section data index information in the nonvolatile memory 903 by the processor 901 is specifically:

the processor 901 stores ETT index information in the nonvolatile memory 903, where the ETT index information includes a data type of the ETT section data and data length information of the ETT section data, and the data length information of the ETT section data includes start byte information of the ETT section data and a length of the ETT section data; and/or the processor 901 stores EIT index information in the nonvolatile memory 903, where the EIT index information includes a data type of the EIT section data and data length information of the EIT section data, and the data length information of the EIT section data includes start byte information of the EIT section data and a length of the EIT section data; and/or the processor 901 stores VCT index information in the nonvolatile memory 903, where the VCT index information includes a data type of the VCT section data and data length information of the VCT section data, and the data length information of the VCT section data includes start byte information of the VCT section data and a length of the VCT section data.

As an optional implementation manner, the section data includes common data table CDT section data, and a manner of storing the section data index information in the nonvolatile memory 903 by the processor 901 is specifically:

the processor 901 stores CDT index information in the nonvolatile memory 903, where the CDT index information includes a data type of the CDT section data and data length information of the CDT section data, and the data length information of the CDT section data includes start byte information of the CDT section data and a length of the CDT section data.

As an optional implementation manner, the section data index information includes the PMT index information, the SDT index information, the NIT index information, and the PAT index information, and a manner of reading the section data index information and reading the section data by using the section data index information by the processor 901 is specifically:

the processor 901 reads the PMT index information, and reads the PMT section data by using the PMT index information; and/or the processor 901 reads the SDT index information, and reads the SDT section data by using the SDT index information; and/or the processor 901 reads the NIT index information, and reads the NIT section data by using the NIT index information; and/or the processor 901 reads the PAT index information, and reads the PAT section data by using the PAT index information.

As an optional implementation manner, the section data index information includes the ETT index information, the EIT index information, and the VCT index information, and a manner of reading the section data index information and reading the section data by using the section data index information by the processor 901 is specifically:

the processor 901 reads the ETT index information, and reads the ETT section data by using the ETT index information; and/or the processor 901 reads the EIT index information, and reads the EIT section data by using the EIT index information; and/or the processor 901 reads the VCT index information, and reads the VCT section data by using the VCT index information.

As an optional implementation manner, the section data index information includes the CDT index information, and a manner of reading the section data index information and reading the section data by using the section data index information by the processor 901 is specifically:

the processor 901 reads the CDT index information, and reads the CDT section data by using the CDT index information.

As an optional implementation manner, a manner of reading, by the processor 901, the section data from the transport stream data TS packets received by the receiver 904 is specifically:

the processor 901 selects a target TS packet from the transport stream data TS packets received by the receiver 904, where a packet identifier of the target TS packet is a specified packet identifier, and the target TS packet includes the section data; and the processor 901 reads the section data from the target TS packet.

In this embodiment of the present invention, using the digital television device described in the embodiment shown in FIG. 9 can save storage space of a memory and a nonvolatile memory in a case in which no loss of PSI/SI is ensured.

A sequence of the steps of the method in the embodiments of the present invention may be adjusted, and certain steps may also be merged or removed according to an actual need.

Merging, division, and removing may be performed on units or subunits of a terminal or a device in the embodiments of the present invention according to an actual need.

A person of ordinary skill in the art may understand that all or some of the steps of the method embodiments may be implemented by a program instructing relevant hardware. The program may be stored in a computer readable storage medium. The storage medium includes a ROM, a random access memory (RAM), a PROM, an EPROM, a one-time programmable read-only memory (OTPROM), an electrically-erasable programmable read-only memory (EEPROM), a compact disc read-only memory (CD-ROM), or another optical disc memory, magnetic disk memory, magnetic tape memory, or any other computer readable medium that can be used to carry or store data.

The foregoing describes in detail the program play control method and the digital television device disclosed in the embodiments of the present invention. In this specification, specific examples are used to describe the principle and implementation manners of the present invention, and the description of the embodiments is only intended to help understand the method and core idea of the present invention. In addition, a person of ordinary skill in the art may, based on the idea of the present invention, make modifications with respect to the specific implementation manners and the application scope. Therefore, the content of this specification shall not be construed as a limitation on the present invention.

What is claimed is:

1. A program play control method, comprising:
    reading section data from received transport stream (TS) data packets, and saving the section data in a nonvolatile memory without parsing the section data, wherein the section data carries program specific information (PSI) and system information (SI) in an unparsed format;
    when audio/video data carried in a TS data packet corresponding to the PSI is to be played, copying the section data from the nonvolatile memory to a memory buffer, parsing the section data in the memory buffer to obtain the PSI and the SI, and saving the PSI and the SI by using a dynamically allocated second memory; and
    reading the PSI from the second memory, playing, according to the PSI, the audio/video data carried in the TS data packet corresponding to the PSI, reading the SI from the second memory, and displaying the SI.

2. The method according to claim 1, wherein before parsing the section data to obtain the PSI and the SI, the method further comprises:
    storing section data index information in the nonvolatile memory, wherein the section data index information comprises a data type of the section data and data length information of the section data, and the data length information of the section data comprises start byte information of the section data and a length of the section data; and
    reading the section data index information, and reading the section data by using the section data index information.

3. The method according to claim 2, wherein:
    the section data comprises program management table (PMT) section data, service description table (SDT) section data, network information table (NIT) section data, and program associate table (PAT) section data; and
    storing section data index information in the nonvolatile memory comprises at least one of:
        storing PMT index information in the nonvolatile memory, wherein the PMT index information comprises a data type of the PMT section data and data length information of the PMT section data, and the data length information of the PMT section data comprises start byte information of the PMT section data and a length of the PMT section data;
        storing SDT index information in the nonvolatile memory, wherein the SDT index information comprises a data type of the SDT section data and data length information of the SDT section data, and the data length information of the SDT section data comprises start byte information of the SDT section data and a length of the SDT section data;
        storing NIT index information in the nonvolatile memory, wherein the NIT index information comprises a data type of the NIT section data and data length information of the NIT section data, and the data length information of the NIT section data comprises start byte information of the NIT section data and a length of the NIT section data; and storing PAT index information in the nonvolatile memory, wherein the PAT index information comprises a data type of the PAT section data and data length information of the PAT section data, and the data length information of the PAT section data comprises start byte information of the PAT section data and a length of the PAT section data.

4. The method according to claim 3, wherein:
the section data index information comprises the PMT index information, the SDT index information, the NIT index information, and the PAT index information; and
reading the section data index information, and reading the section data by using the section data index information comprises at least one of:
  reading the PMT index information, and reading the PMT section data by using the PMT index information;
  reading the SDT index information, and reading the SDT section data by using the SDT index information;
  reading the NIT index information, and reading the NIT section data by using the NIT index information; and
  reading the PAT index information, and reading the PAT section data by using the PAT index information.

5. The method according to claim 2, wherein:
the section data comprises extended text table (ETT) section data, event information table (EIT) section data, and virtual channel table (VCT) section data; and
storing section data index information in the nonvolatile memory comprises at least one of:
  storing ETT index information in the nonvolatile memory, wherein the ETT index information comprises a data type of the ETT section data and data length information of the ETT section data, and the data length information of the ETT section data comprises start byte information of the ETT section data and a length of the ETT section data;
  storing EIT index information in the nonvolatile memory, wherein the EIT index information comprises a data type of the EIT section data and data length information of the EIT section data, and the data length information of the EIT section data comprises start byte information of the EIT section data and a length of the EIT section data; and
  storing VCT index information in the nonvolatile memory, wherein the VCT index information comprises a data type of the VCT section data and data length information of the VCT section data, and the data length information of the VCT section data comprises start byte information of the VCT section data and a length of the VCT section data.

6. The method according to claim 5, wherein:
the section data index information comprises the ETT index information, the EIT index information, and the VCT index information; and
reading the section data index information, and reading the section data by using the section data index information comprises at least one of:
  reading the ETT index information, and reading the ETT section data by using the ETT index information;
  reading the EIT index information, and reading the EIT section data by using the EIT index information; and
  reading the VCT index information, and reading the VCT section data by using the VCT index information.

7. The method according to claim 2, wherein:
the section data comprises common data table (CDT) section data; and
storing section data index information in the nonvolatile memory comprises:
  storing CDT index information in the nonvolatile memory, wherein the CDT index information comprises a data type of the CDT section data and data length information of the CDT section data, and the data length information of the CDT section data comprises start byte information of the CDT section data and a length of the CDT section data.

8. The method according to claim 7, wherein:
the section data index information comprises the CDT index information; and
reading the section data index information, and reading the section data by using the section data index information comprises:
  reading the CDT index information, and reading the CDT section data by using the CDT index information.

9. The method according to claim 1, wherein reading the section data from the received TS data packets comprises:
  selecting a target TS data packet from the received TS data packets, wherein a packet identifier of the target TS data packet is a specified packet identifier, and the target TS data packet comprises the section data; and
  reading the section data from the target TS data packet.

10. A digital television device, comprising:
a nonvolatile memory;
a dynamically allocated second memory;
a processor configured to:
  read section data from received transport stream (TS) data packets, and save the section data in the nonvolatile memory, wherein the section data carries program specific information (PSI) and system information (SI);
  when audio/video data carried in a TS data packet corresponding to the PSI is to be played, copy the section data from the nonvolatile memory to a memory buffer, and parse the section data in the memory buffer to obtain the PSI and the SI;
  save the PSI and the SI by using the second memory; and
  read the PSI from the second memory, play, according to the PSI, the audio/video data carried in the TS data packet corresponding to the PSI, read the SI from the second memory, and display the SI.

11. The digital television device according to claim 10, wherein the processor is further configured to:
  store section data index information in the nonvolatile memory, wherein the section data index information comprises a data type of the section data and data length information of the section data, and the data length information of the section data comprises start byte information of the section data and a length of the section data; and
  read the section data index information, and read the section data by using the section data index information.

12. The digital television device according to claim 11, wherein:
  the section data comprises program management table (PMT) section data, service description table (SDT) section data, network information table (NIT) section data, and program associate table (PAT) section data; and the processor is further configured to at least one of:
- store PMT index information in the nonvolatile memory, wherein the PMT index information comprises a data type of the PMT section data and data length information of the PMT section data, and the data length information of the PMT section data comprises start byte information of the PMT section data and a length of the PMT section data;
- store SDT index information in the nonvolatile memory, wherein the SDT index information comprises a data type of the SDT section data and data length information of the SDT section data, and the data length information of the SDT section data comprises start byte information of the SDT section data and a length of the SDT section data;
- store NIT index information in the nonvolatile memory, wherein the NIT index information comprises a data type of the NIT section data and data length information of the NIT section data, and the data length information of the NIT section data comprises start byte information of the NIT section data and a length of the NIT section data; and
- store PAT index information in the nonvolatile memory, wherein the PAT index information comprises a data type of the PAT section data and data length information of the PAT section data, and the data length information of the PAT section data comprises start byte information of the PAT section data and a length of the PAT section data.

13. The digital television device according to claim 12, wherein:
the section data index information comprises the PMT index information, the SDT index information, the NIT index information, and the PAT index information; and
the processor is further configured to at least one of:
- read the PMT index information, and reads the PMT section data by using the PMT index information;
- read the SDT index information, and reads the SDT section data by using the SDT index information;
- read the NIT index information, and reads the NIT section data by using the NIT index information; and
- read the PAT index information, and reads the PAT section data by using the PAT index information.

14. The digital television device according to claim 11, wherein:
the section data comprises extended text table (ETT) section data, event information table (EIT) section data, and virtual channel table (VCT) section data; and
the processor is further configured to at least one of:
- store ETT index information in the nonvolatile memory, wherein the ETT index information comprises a data type of the ETT section data and data length information of the ETT section data, and the data length information of the ETT section data comprises start byte information of the ETT section data and a length of the ETT section data;
- store EIT index information in the nonvolatile memory, wherein the EIT index information comprises a data type of the EIT section data and data length information of the EIT section data, and the data length information of the EIT section data comprises start byte information of the EIT section data and a length of the EIT section data; and
- store VCT index information in the nonvolatile memory, wherein the VCT index information comprises a data type of the VCT section data and data length information of the VCT section data, and the data length information of the VCT section data comprises start byte information of the VCT section data and a length of the VCT section data.

15. The digital television device according to claim 14, wherein:
the section data index information comprises the ETT index information, the EIT index information, and VCT index information; and
the processor is further configured to at least one of:
- read the ETT index information, and read the ETT section data by using the ETT index information;
- read the EIT index information, and read the EIT section data by using the EIT index information; and
- read the VCT index information, and read the VCT section data by using the VCT index information.

16. The digital television device according to claim 11, wherein:
the section data comprises common data table (CDT) section data; and
the processor is further configured to:
- store CDT index information in the nonvolatile memory, wherein the CDT index information comprises a data type of the CDT section data and data length information of the CDT section data, and the data length information of the CDT section data comprises start byte information of the CDT section data and a length of the CDT section data.

17. The digital television device according to claim 16, wherein:
the section data index information comprises the CDT index information; and
the processor is further configured to:
- read the CDT index information, and read the CDT section data by using the CDT index information.

18. The digital television device according to claim 10, wherein the processor is further configured to:
select a target TS data packet from the received TS data packets, wherein a packet identifier of the target TS data packet is a specified packet identifier, and the target TS data packet comprises the section data; and
read the section data from the target TS data packet.

* * * * *